H. F. FRISBIE.
Millstone Bush.

No. 110,843. Patented Jan. 10, 1871.

P soft-metal bearing

Witnesses:
S. S. Mabee
Alex F. Roberts

Inventor:
H. F. Frisbie
per
Wmmm/S
Attorneys.

United States Patent Office.

HAMLIN F. FRISBIE, OF DANVILLE, ILLINOIS.

Letters Patent No. 110,843, dated January 10, 1871.

IMPROVEMENT IN MILL-BUSHES.

The Schedule referred to in these Letters Patent and making part of the same.

*To all whom it may concern:*

Be it known that I, HAMLIN F. FRISBIE, of Danville, in the county of Vermillion and State of Illinois, have invented a new and improved Mill-Bush; and I do hereby declare that the following is a full, clear, and exact description thereof, which will enable others skilled in the art to make and use the same, reference being had to the accompanying drawing forming part of this specification.

My invention relates to bushes for mill-stones; and

It consists in the improvements herein described and afterward specified in claims.

Similar letters of reference indicate corresponding parts.

A is the cast-metal shell of the bush, made with the four usual recesses B, for the bearings C above the bottom plate D.

Between these recesses are the triangular parts E of the bush, extending to the wall of the central bore, for the spindle-bearing F.

I propose to make vertical openings, G, in these parts, extending from bottom to top, or as high as the said parts E rise, for the admission and circulation of air to keep the bearings and journal cool.

I propose to make metal bearings, C, and provide them with oil-recesses, H, from which holes I lead through the wall to the journal for holding oil or other lubricating substance and supplying it to the wearing parts, the said holes being packed with wicking or other absorbent material, which will regulate the flow.

For keying up the bearings to the journal I make vertical recesses behind them and place therein wedges, I, provided with adjusting-screws K, fitted through the bottom and arranged to force the wedges up and down, and for the application of the hand to the knobs L below for turning them.

In this example I have represented a large annular recess in the bush-case at the top, under the detachable cap M, in which I propose to place, when preferred or required, the annular oil-vessel N, with holes O leading to the spindle F, to be filled with absorbent material for lubricating the spindle above the tops of the bearings; but, in case this vessel is not used, the parts E of the bush and the bearings will be extended to the top of the part A, or thereabout.

The bearing faces of the bearing-blocks C may have Babbit or other soft or composition metal fitted into the grooves P therein, or otherwise attached, to reduce the heat and friction.

The recesses for the bearings C are placed opposite the corners of the bush, and thereby more space is afforded for the recesses for the keys I. This arrangement causes the parts E to come opposite the centers of the sides of the bush where the metal is thinnest and strengthen them.

It will be seen that a considerable circulation of air may be kept up in contact with the bearings and other parts of the bush well calculated to prevent heating, and that the bearings may be adjusted while the stone is running in a very accurate and reliable manner, without affecting the "train" of the spindle.

Having thus described my invention,

I claim as new and desire to secure by Letters Patent—

Figure 1:
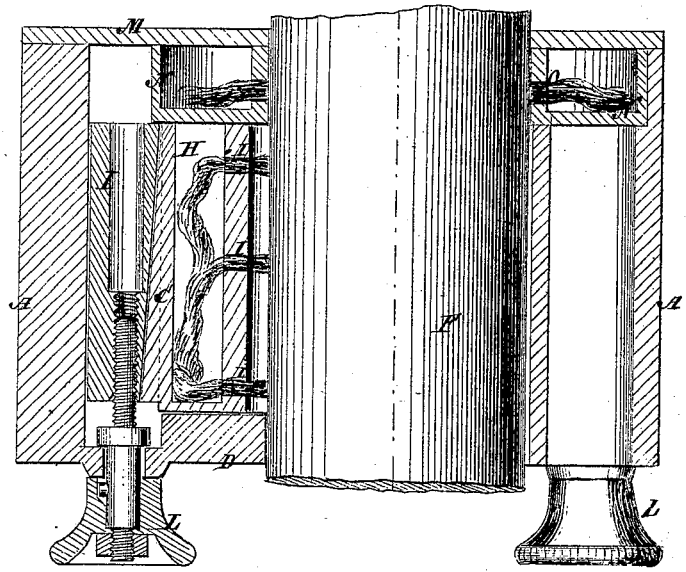
Figure 1 represents a sectional elevation of my improved bush.
Figure 2:
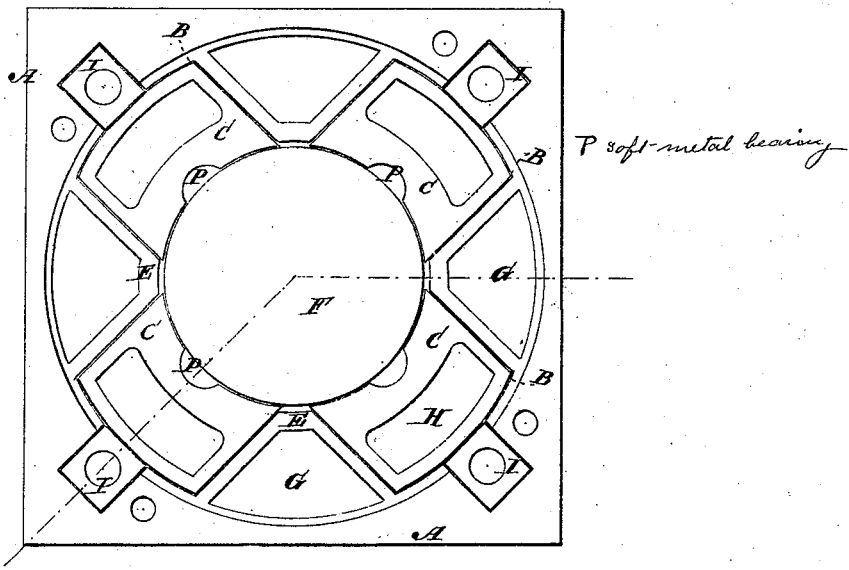
Figure 2 is a top view with the cover removed.

1. The combination, with a wedge, I, of recessed knob and washer L, a shouldered and studded bolt, and a clamping-nut, all constructed and applied as shown in fig. 1 of drawing.

2. The hollow bearing-pieces H C, combined with a case, B, hollow triangular pieces E G, and upper annular chamber M O, constructed and relatively arranged as shown and described.

HAMLIN F. FRISBIE.

Witnesses:
ALEXANDER LOGUE,
WM. M. LASH.